United States Patent [19]
Fujii et al.

[11] Patent Number: 5,377,732
[45] Date of Patent: Jan. 3, 1995

[54] WOOD JOINING STRUCTURE AND METHOD THEREOF

[75] Inventors: Tsuyoshi Fujii; Atsushi Miyatake, both of Ibaragi, Japan

[73] Assignee: Forestry and Forest Products Research Institute, Ibagagi, Japan

[21] Appl. No.: 126,127

[22] Filed: Sep. 23, 1993

Related U.S. Application Data

[62] Division of Ser. No. 37,008, Mar. 25, 1993.

[51] Int. Cl.⁶ .................................................. B27F 1/00
[52] U.S. Cl. .................................... 144/347; 144/353; 156/304.3; 403/294
[58] Field of Search ............... 144/344, 345, 347, 352, 144/353; 156/258, 304.5, 578, 304.1; 52/586.1; 403/294

[56] References Cited

U.S. PATENT DOCUMENTS

| | | |
|---|---|---|
| 2,332,081 | 10/1943 | Hunt et al. . |
| 2,398,603 | 4/1946 | Soderberg . |
| 3,592,717 | 7/1971 | Gaughran . |
| 3,602,275 | 8/1971 | Nissen ........................ 144/347 |
| 4,015,035 | 3/1977 | Blad et al. . |
| 4,314,871 | 2/1982 | Weinstock et al. ................ 144/347 |
| 5,125,442 | 6/1992 | Hendrickson ..................... 144/353 |

FOREIGN PATENT DOCUMENTS

| | | | |
|---|---|---|---|
| 878102 | 6/1953 | Germany | ........................ 144/353 |
| 559890 | 3/1957 | Italy . | |
| 239257 | 1/1946 | Switzerland | ........................ 144/353 |

*Primary Examiner*—W. Donald Bray
*Attorney, Agent, or Firm*—Barry R. Lipsitz

[57] ABSTRACT

A technique is provided for joining wood members. A plurality of slits are formed on the end portions of wood pieces desired to be joined, and the end portions are abutted with corresponding slits in alignment to form a common surface. Each of the abutted wood end portions is fixed by temporary fixing means to a desired joining state. Thereafter, an adhesive agent is applied into the interior surfaces of the slits. Connecting plates, e.g., made of a reinforced plastic material coated with the adhesive agent, are inserted into the aligned slits. The adhesive agent is then hardened.

20 Claims, 20 Drawing Sheets

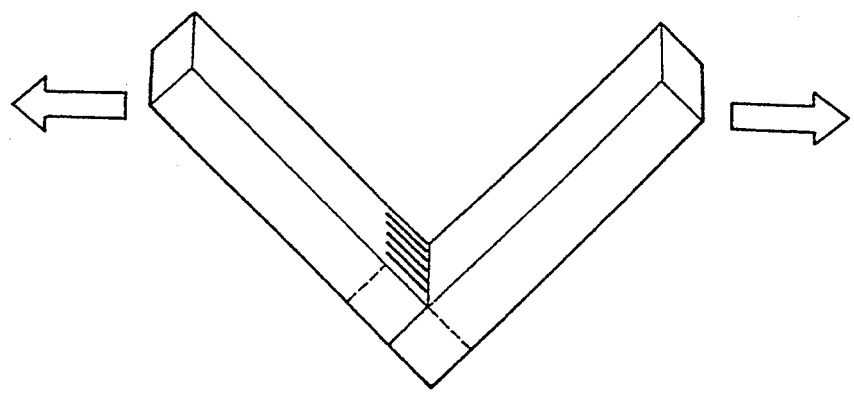
F I G. 13

F I G. 18
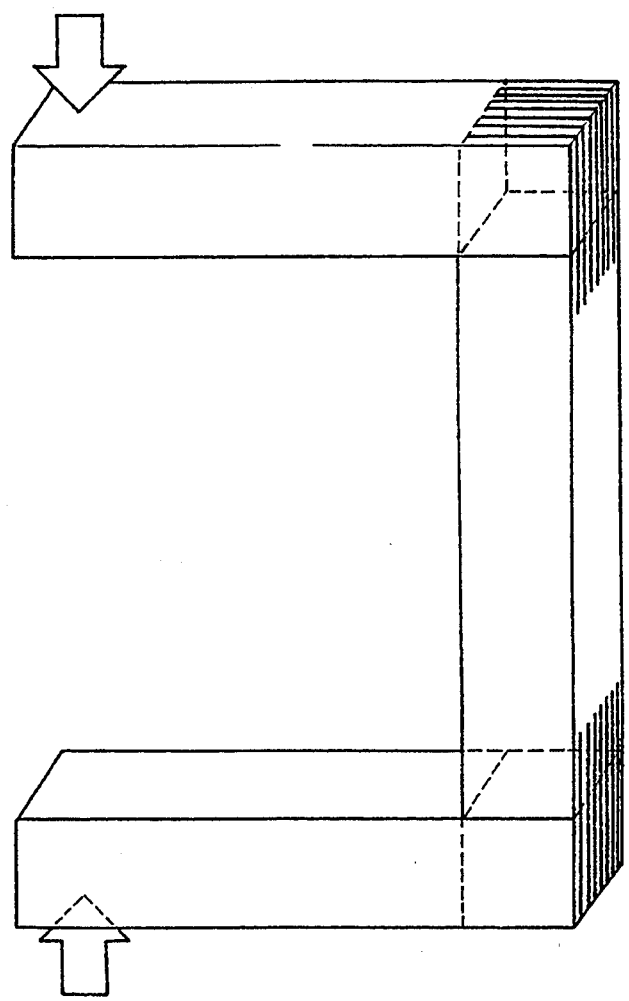

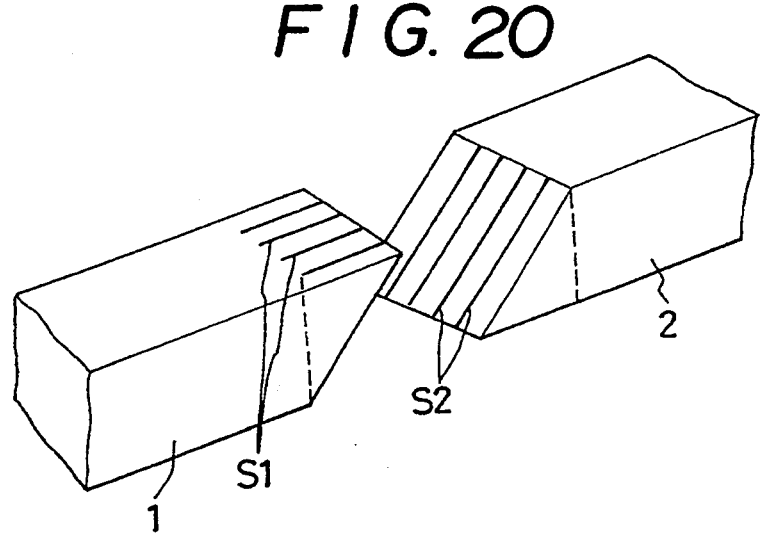
F I G. 20

F I G. 28(a)
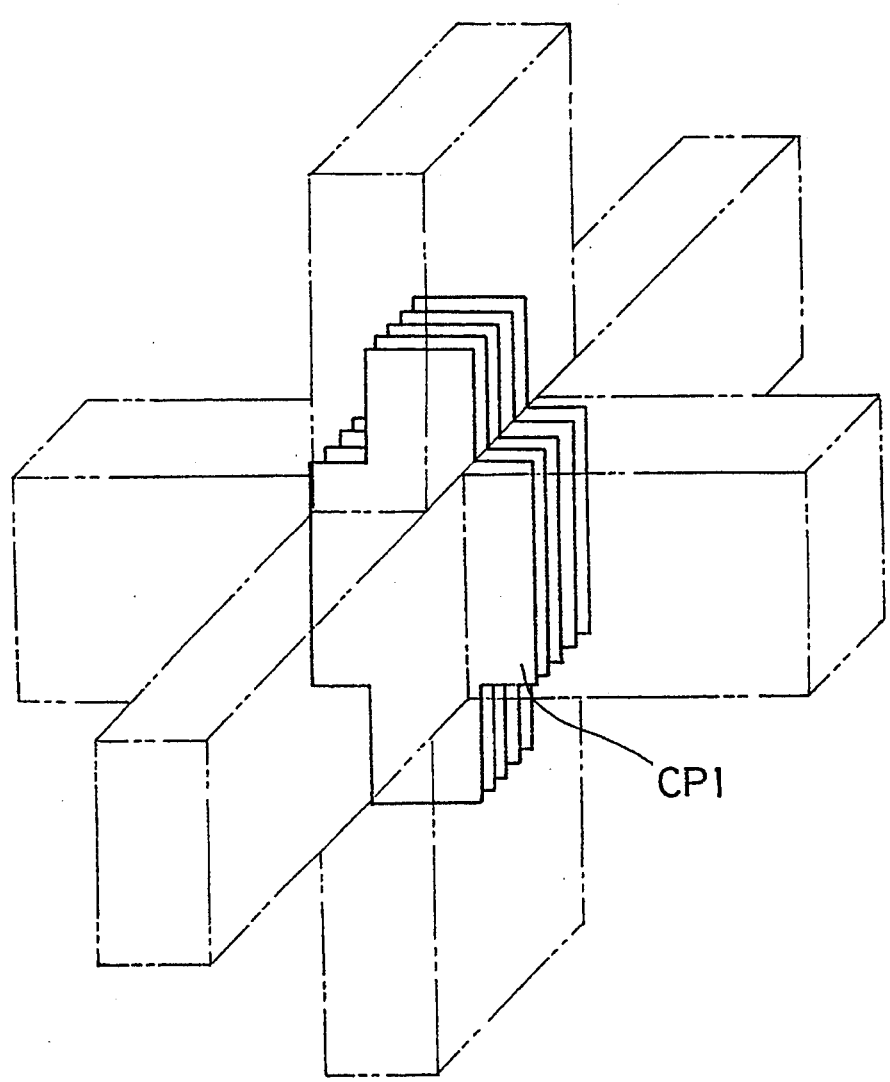

WOOD JOINING STRUCTURE AND METHOD THEREOF

This application is a division of co-pending U.S. patent application Ser. No. 07/037,008 filed on Mar. 25, 1993.

FIELD OF THE INVENTION

The present invention relates to a joining technique by adhering of wood, and more particularly to a joining technique by an adhering method especially exerting an effect in joining toward a lengthwise direction or multiple directions of long size material or else in joining in a perpendicular direction.

BACKGROUND OF THE INVENTION

The wood has been widely used for generations as an optimum material for a building material and furniture from many advantages such as beauty of quality sense, easiness of working, or easiness of obtaining, and capable of recycling as resources.

And, case of intending to utilize the wood as described above, a matter which has been always a problem from years gone by to today is a problem of deciding how to handle a joining portion between members, in other words, a handling capable of bearing against a stress operating to the joining portions.

For instance of building material, nails or metal fittings have been used for the joining of column or girder in a small size house, and bolts, lug screws, drift pins have been used for the joining of trusses of a large size building.

However, in order to join the members without decreasing of strength by these methods, a number of joining materials or large sized metal fittings are required. As a result, problems are occurred that its cost is increased and beautiful appearance is decreased.

On the other hand, in accordance with an adhering method, the joining portion can be processed in small and beautiful, but this method is limited to a material that the member size is small as a furniture and a stress for transferring is not so big.

In a utilization of an adhering joining in a large wooden building, a great expectation has been had until now, but for a realization of this, an inducement of higher and newer adhesive agent in an adhering strength and a fireproof characteristic and a development of simple and reliable processing technique are indispensable.

SUMMARY OF THE INVENTION

The present invention aims to solve above-described conventional problems by constructing a joining structure of one wood or lumber and another wood or lumber by comprising a plurality of slits formed at the ends of both lumbers to make same surfaces from one lumber to another lumber, connecting plates which are to be inserted among these slits and made of reinforced plastic material for connecting the both lumbers, and an adhesive agent which is to be filled to the slits whereby fixing the connecting plate and internal surface of the slit; or else, in joining one lumber and another lumber, a plurality of slits are respectively formed such that both of each corresponding slit make same surfaces upon facing the both end portions at the ends of lumbers desired to be joined, the lumber end portions formed with the slits are fixed by a temporary fixing method to a desired joining state each other and then an adhesive agent is applied to the internal surface of the slits, and the connecting plates made of reinforced plastic material applied with adhesive agent on the surface are inserted into gap formed by a slit of one lumber end portion and a slit of another lumber end portion to a same flat surface so as to be put between the both slits and then the adhesive agent is hardened whereby each of the lumber end portions are joined and fixed one another, so that, for instance in a large size wooden building, a joining technique of wood members being excellent in strength, beautiful outlook and workability is provided by a simple construction.

Further, in above description, an epoxy resin reinforced by a glass fiber or a carbon fiber is used for the reinforcing plastic material, an epoxy group adhesive agent is used for the adhesive agent, and a transparent sticker tape is used for the temporary fixing method.

In the present invention, since each other of the lumbers are made such that the reinforcing plastic plate is inserted and held into a plurality of the slit portions formed to each and to be faced each other whereby these are fixed by an adhesive agent, it exceeds further more than the joining strength in accordance with the conventional technique, and realizes a strength near the strength of lumber itself, and besides a joining is possible which does not produce a deformation of difference of the joining portions.

And, special metal fittings are required for the joining of more than three directions in the conventional technique, on the contrary, in accordance with the present invention, it is possible to join in free angle by simply cutting the lumber end portion to a predetermined slant angle, and a junction of more than three directions can be readily carried out by changing the pattern of the connecting plate. And, since the connecting plate is buried into an interior of the lumber, a design and structure being excellent in beautiful outlook can be obtained, and since the lumbers are firmly joined by small area, a calculation of the structure is also extremely simple.

BRIEF DESCRIPTION OF THE DRAWINGS

FIG. 13 is a perspective view showing a load test of the lumber joined toward rectangular two directions, FIG. 18 is a perspective view showing a compression test of the lumber joined in a C-shape by three members of big cross section, FIG. 20 is a view showing a fifth embodiment of the present invention, and is a perspective view showing a pattern of the lumber end portion and a cut out state of the slit.

DETAILED DESCRIPTION OF THE PREFERRED EMBODIMENTS

The preferred embodiments of the present invention will be described in more detail with reference to the accompanying drawings.

FIG. 1 to FIG. 4 are views showing a first embodiment, and two members are joined in straight direction in this embodiment.

Figure 1:
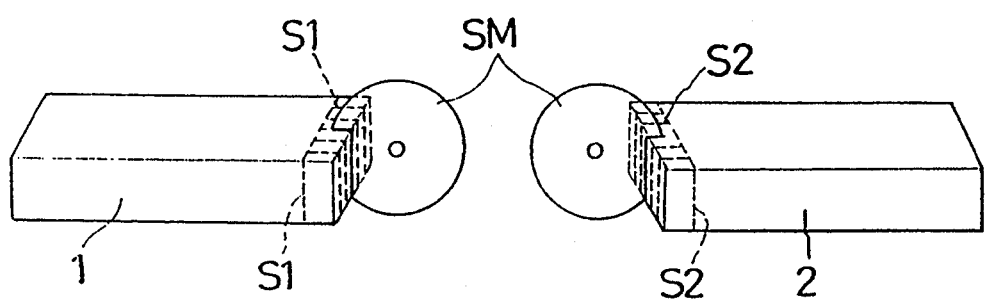
FIG. 1 is a perspective view showing a slit formation in a first preferred embodiment of the present invention.

First, the slits S1,S2 are respectively formed by a circular saw SM in a direction perpendicular to the end surfaces of the lumbers 1,2 to be joined(refer to FIG. 1). The lumber used here is a cryptomeria collective material (5 layers, 100×75), and sizes and patterns of each slit are carried out by three kinds of approximately 2.6 mm (thickness or gap width)×25 mm width×75 mm length (lumber thickness), 2.6 mm(thickness)×50 mm width×75 mm length (lumber thickness), and 2.6 mm (thickness)×75 mm width×75 mm (lumber thickness). (Refer to hereinafter described table 1)

Further, the slits are formed by five rows with 20 mm gaps, but the row numbers of the slits are suitably determined corresponding to the pattern and size of the lumber.

Figure 2:
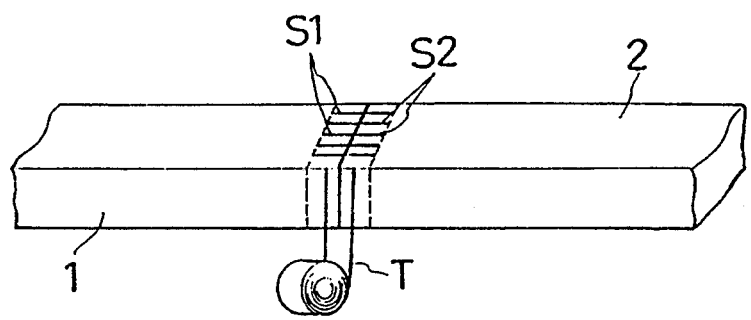
FIG. 2 is a perspective view showing a state that two members are temporarily fixed by facing the slit portions each other.
Figure 3:
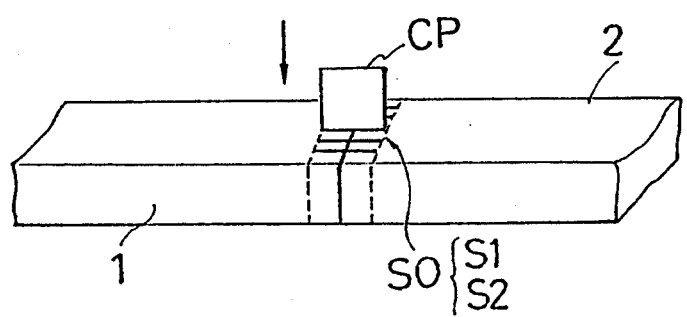
FIG. 3 is a perspective view showing a process for inserting the connecting plate into the slit portion of joining portion.

Next, as shown in FIG. 2, two lumbers(collective material) 1,2 are made to face each other in lengthwise direction so as to make each slit S1(5 rows) and S2(5 rows) to face each other and continue whereby form same surfaces, a transparent sticker tape T (temporary fixing method) is sticked to both side surfaces and bottom surface excluding top surface of abutting portion (joining portion) of the lumbers 1,2 whereby the lumbers 1,2 are held to a joining state. In this state, as shown in FIG. 3, an epoxy resin adhesive agent (it may be an acryl or polyurethane group) is applied into an interior of the slit portion SO of five rows constructed by the respective five row slits 1,2 and at the same time, the connecting plate CP applied with same adhesive agent to both surfaces is inserted into the slit portion SO and then they are left in air until the adhesive agent can harden.

Leakage of the adhesive agent can be prevented by using of the sticker tape T (temporary fixing method), and a viewing of the adhered state becomes possible by using the transparent material.

Here, the connecting plate CP is formed with a glass fiber reinforced epoxy resin of 2 mm thickness, and this size pattern is made to fit to the slit portion SO.

Further, in applying the adhesive agent to the connecting plate CP, the surface is cleaned by a methylethylketone resin and the like, and when the adhesive agent is in lack at a time that the connecting plate CP is inserted into the slit portion SO, it is further injected. In this embodiment, the connecting plate CP is formed by a glass fiber reinforced epoxy resin material, but a carbon fiber reinforced epoxy resin material can be used, and a polyester can also be used as a resin material.

Moreover, for the glass fiber reinforced epoxy resin material, a matter of material property having a tensile strength of 10–20 times of the wood, a thermal conductivity of 1–5 times, a linear expansion rate, and a Young's modulus are employed.

Figure 4:
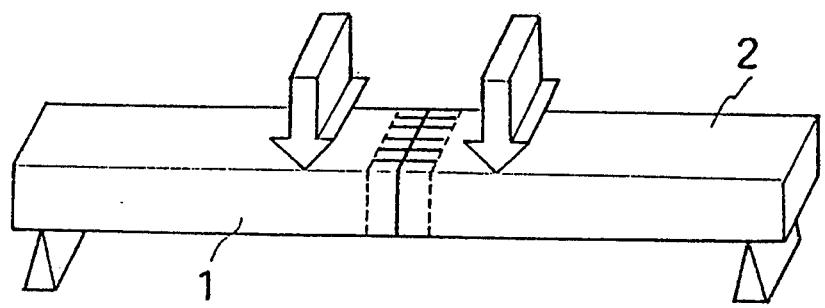
FIG. 4 is a perspective view showing a load test of the lumber joined to a straight direction.

A test material which has been adhered and joined toward lengthwise direction by the above-described process and elapsed one week is disposed with the joining portion at the central portion of span 1100 mm as shown in FIG. 4, and as a result of excuting a bending test by a two points loading method interposing this portion, the joining strength is as shown in following table 1, in case that a length of the slit is taken to 75 mm, its bending strength has become to 342 kg/cm$^2$–375 kg/cm$^2$, and it has exhibited a numerical value of equal with the bending strength 345 kg/cm$^2$ of a cryptomeria structural collective material(first class).

And, in a damaging condition, a break down of the wood and an exfoliation of the adhered layer, and a cut down of the connecting plate(reinforced plastic material) have been about simultaneously occurred. From above result, it was proved that when the lumber is adhered and joined by interposing a reinforced plastic material connecting plate of pertinent size between the slits by the above-described process, it can be made to an integral body without decreasing the strength.

TABLE 1

| Length of ERP connecting plat (cm × cm) | Number of ERP connecting plate | Maximum load (kg) | Maximum bending moment (10$^2$ kg × cm) | Bending strength (kg/cm$^2$) |
|---|---|---|---|---|
| 5.0 × 7.5 | 5 | 1190 | 173 | 184 |
| 5.0 × 7.5 | 5 | 810 | 178 | 189 |
| 10.0 × 7.5 | 5 | 1148 | 259 | 268 |
| 10.0 × 7.5 | 5 | 1138 | 249 | 266 |
| 10.0 × 7.5 | 5 | 1056 | 231 | 246 |
| 10.0 × 7.5 | 5 | 995 | 218 | 232 |
| 15.0 × 7.5 | 5 | 1551 | 339 | 362 |
| 15.0 × 7.5 | 5 | 1605 | 351 | 375 |
| 15.0 × 7.5 | 5 | 1465 | 321 | 342 |
| 15.0 × 7.5 | 5 | 1585 | 347 | 370 |

*A bending strength of the cryptomeria material is 345 kg/cm$^2$ in class 1, and 285 kg/cm$^2$ in class 2. The cryptomeria collective material used for this test has a strength characteristic of this range.

The second embodiment will be described with reference to FIG. 5 to FIG. 9. This embodiment is basically same as aforementioned first embodiment, and two members having big cross sectional area are joined in straight direction.

Figure 5:
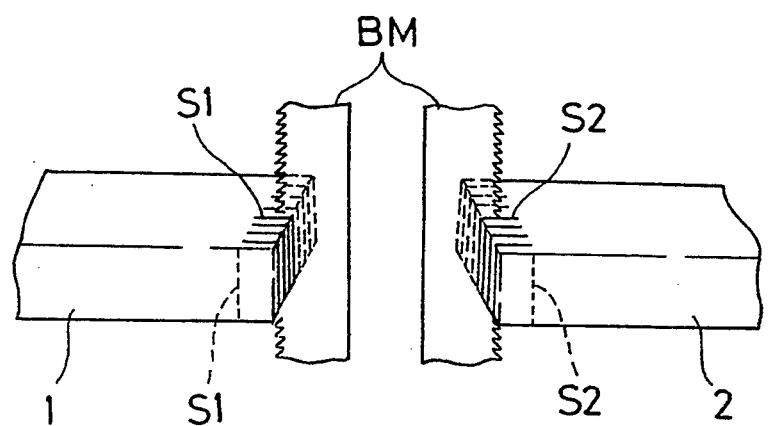
FIG. 5 is a perspective view showing a slit formation in a second preferred embodiment of the present invention.
Figure 6:
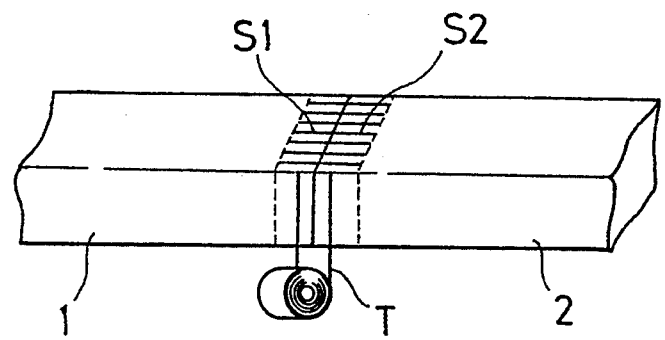
FIG. 6 is a perspective view showing a state that two members are temporarily fixed by facing the slit portions each other.
Figure 7:
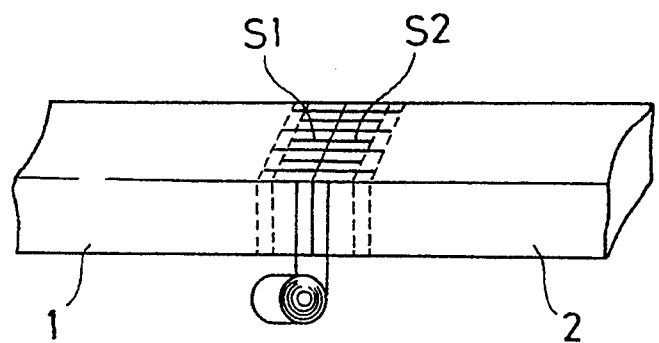
FIG. 7 is a perspective view of a case that the slits of different sizes are alternately faced in FIG. 5.
Figure 8:
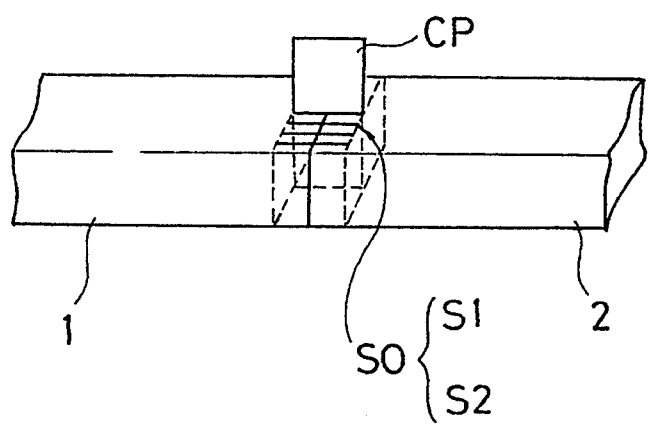
FIG. 8 is a perspective view showing a process for inserting the connecting plate into the slit portions of joining portion in FIG. 5.
Figure 9:
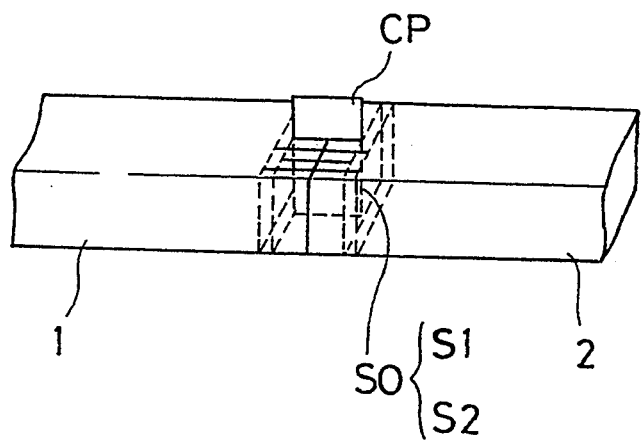
FIG. 9 is a perspective view of a case that a size of the connecting plate is made to a half of the slit in FIG. 5.

First, slits S1,S2 are respectively formed by a band saw SM in a perpendicular direction to the end surfaces of the lumbers 1,2 desired to be joined (refer to FIG. 5). The lumbers used in this embodiment is a larch collective material {It is constructed to twelve layers by a drawn plate(lamina) of 150 mm×300 mm}. Next, as shown in FIGS. 6 and 7, two lumbers(collective material) 1,2 are abutted to lenghthwise direction, and each slit S1(7 rows), S2(7 rows) is made to form same surfaces by respectively confronting and continuing, and the adhesive tape T (temporary fixing method) is firmly fixed to both side surfaces and to bottom surface of the abutted portion (joined portion) of the lumbers 1,2 whereby the lumbers 1,2 are fixed to a joined state. In this state, as shown in FIG. 8 and FIG. 9, an epoxy resin adhesive agent is applied into the slits SO of seven rows made of the slits 1,2 of the seven rows and at the same time, the connecting plates CP applied with same adhesive agent are inserted into the slits SO and then left in air until the adhesive agent is hardened. Other processes are same as aforementioned embodiments shown in FIG. 1 to FIG. 4.

The joined portion of the lumber (test materials) joined to the lengthwise direction by the process as above is placed at central portion of span of 4000 mm as shown in FIG. 4, and a bending test is carried out by a two points load system. Following table 2 is a table showing the test result.

TABLE 2

| Slit size (mm) width by length (lumber thickness) | Connecting plate size width by length | Number of connecting plate | Maximum load (10$^3$ Kg) | Maximum bending moment (10$^3$ $^{kg}$ × cm) | Bending strength (Kg/cm$^2$) |
|---|---|---|---|---|---|
| S1:150 × 300 S2:150 × 300 | 300 × 300 (a) | 7 | 9.29 | 650 | 289 |
| S1:150 × 150 S2:150 × 150 | 300 × 150 (b) | 7 | 10.23 | 716 | 318 |
| S1:200 × 300 S2:200 × 300 | 400 × 300 (c) | 7 | 11.25 | 788 | 350 |
| S1:200 × 150 S2:200 × 150 | 400 × 150 (d) | 7 | 11.54 | 808 | 359 |
| S1:200 × 300 & S2:250 × 300 are alternately formed S2:same as S1 | 400 × 300 & 500 × 300 are alternately placed (e) | 7 | 12.7 | 806 | 382 |
| S1:200 × 150 & 250 × 150 are alternately formed S2:same as S1 | 400 × 150 & 500 × 150 are alternately placed (f) | 7 | 12.00 | 889 | 395 |

As will be clear from above table, the size and pattern of each slit of both S1,S2 is made to be alternately placed with a matter of about 3 mm(thickness)×150 mm(width)×300 mm (length, equal to the thickness of the lumber), a matter of 3 mm(thickness)×200 mm(width)×300 mm (length, equal to the thickness of the lumber), and a matter of 3 mm (thickness)×200 mm (width)×300 mm (length, equal to the thickness of the lumber) and a matter of 3 mm (thickness)×250 mm(width)×300 mm(length, equal to the thickness of the lumber) (refer to FIG. 7). And, the slits are formed with seven rows by 20 mm intervals.

On the other hand, for the connecting plate CP, the test is carried out by using both of a case of same size with the slit {(a),(c),(e) in the table 2}, and a case that the size of the lengthwise direction(lumber thickness direction) is a half of the lumber thickness {(b), (d), (f) in the table 2).

In accordance with the result of the test, the joining strength increases in response to the increasing of length of the slit as is clear in the table 2, and in case of (e) and (f), their bending strengths come to 382–395 kg/m$^2$, and they exhibited numerical values of extremely close to the bending strength 405 kg/m$^2$ of a latch collective material for structural material(class 1). Further, since a difference of the bending strength is extremely small in case of 300 mm and in case of 150 mm of the size of length of the connecting plate CP, in case of the bending member, a sufficient bearing strength was exerted by inserting the connecting plate only to a place which receives a tensile stress. And, for a damage condition, an exfoliation of the adhering layer and a cut down of the lumber are substantially simultaneously occurred. From above result, when the lumbers are adhered and joined to a lengthwise direction by interposing the reinforcing plastic material connecting plate of appropriate size by above-described process, it was proved that they can be made to be integral without almost reducing the strength.

And next, a third embodiment will be described with reference to FIG. 10 to FIG. 13. In this embodiment, two members are joined orthogonally.

Figure 10:
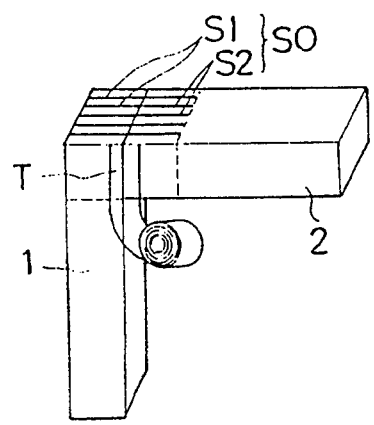
FIG. 10 is a diagram showing a third embodiment of the present invention, and is a perspective view showing a temporary fixing state in a joining toward rectangular two directions of the lumber.

The slits S1,S2 of 2.6 mm thickness are cut by a circular saw in perpendicular direction to the end surface of cryptomeria collective material( five layers, 100 mm×75 mm) 1,2 as same as the first embodiment. The length of each slit is 75 mm, the width is 75 mm as same as the case of the collective material 1,2, the interval is 20 mm, and the row numbers are five. Thus, the collective material 1,2 formed with the slits S1,S2 are rammed to the perpendicular direction as shown in FIG. 10, and the slit portion SO is formed by gathering each slit S1,S2 of five rows of the end surface, and the transparent sticker tape T is supplied and fixed to both side surfaces and bottom surface of the joining place including also a leakage preventing purpose of the adhesive agent in this state.

Figure 11:
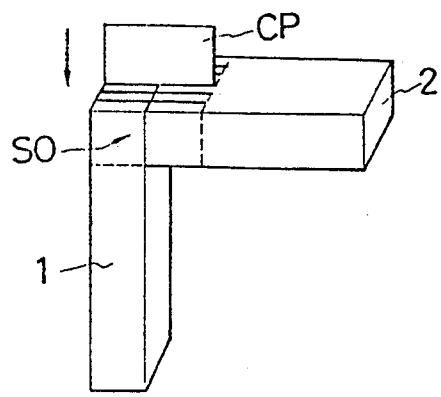
FIG. 11 is a perspective view showing a process for inserting the connecting plate into the slit portion in FIG. 10.
Figure 12:
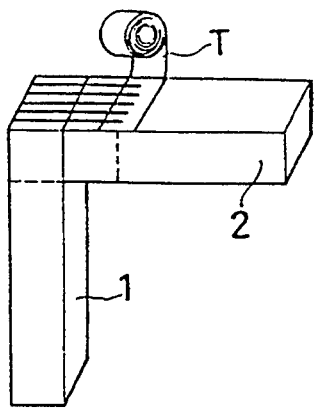
FIG. 12 is a perspective view showing a process for winding a sticker tape for a leak prevention of adhesive agent and a holding after inserting the connecting plate in FIG. 10.

Successively, both side surfaces of the connecting plate (glass fiber reinforced epoxy resin) of size of 75 mm×150 mm with 2 mm thickness are cleaned by a methylethylketone and the like and an epoxy adhesive agent is applied, and then this is inserted into the slit portions SO of five rows (FIG. 11). At this time, the adhesive agent is applied also to interior surface of the slit portion. And, as shown in FIG. 12, the joined portion is wound by a sticker tape T and fixed and then left in air until the adhesive agent hardens.

When the test body adhered and joined to a perpendicular direction in above-described process is place with the adhered and joined portion at a center as shown in FIG. 13 and a tensile load is applied through a bolt at a position distanced 424 mm away in a perpendicular direction from there, the joined strength has exhibited the numerical value equal to the bending strength of the cryptomeria collective material as shown in next table 3. And, for the damaged condition, the cut down of the lumber and the exfoliation of the adhesive agent substantially simultaneously occur. From above result, when the lumber is adhered and joined in a perpendicular direction by interposing the reinforced plastic connecting plate of appropriate size between the slits by the above process, it has become clear that it is possible to make integral without reducing the strength.

TABLE 3

| Length of FRP connecting plate (cm × cm) | Number of FRP connecting plate | Maximum load (kg) | Maximum bending moment ($10^2$ kg × cm) | Bending strength (kg/cm$^2$) |
| --- | --- | --- | --- | --- |
| 15.0 × 7.5 | 5 | 1195 | 395 | 382 |
| 15.0 × 7.5 | 5 | 920 | 276 | 295 |
| 15.0 × 7.5 | 5 | 888 | 266 | 280 |

*The bending material strength of the cryptomeria collective material is 345 kg/cm$^2$ in class 1, and 285 kg/cm$^2$ in class 2. The cryptomeria collective material used in this test has a strength charactaristic of this range.

Further, in above-described second embodiment, it is thought that when the sizes of the connecting plate and slit are increased, the joining strength will be more enhanced.

And next, a fourth embodiment will be described with reference to FIG. 14 to FIG. 19. This embodiment is basically same as the above-described third embodiment, and two members of big cross section are joined to a rectangular direction.

The lumber used in this embodiment is a larch collective material (it is made to twelve layers by a single plate of 150 mm×800 mm).

Figure 14:
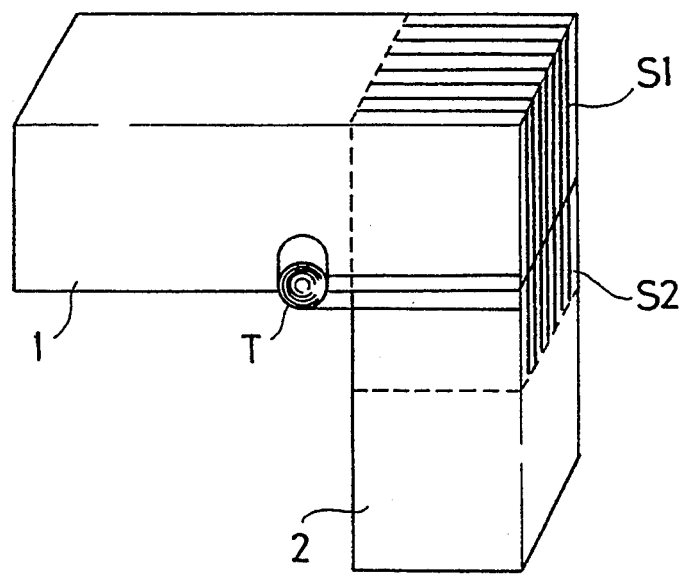
FIG. 14 is a diagram showing a fourth embodiment of the present invention, and is a view of a case for joining a width member(beam member) to a lumber opening of a length member(column), and is a perspective view of a temporarily fixed state that two members make the slit portions to be faced.
Figure 15:
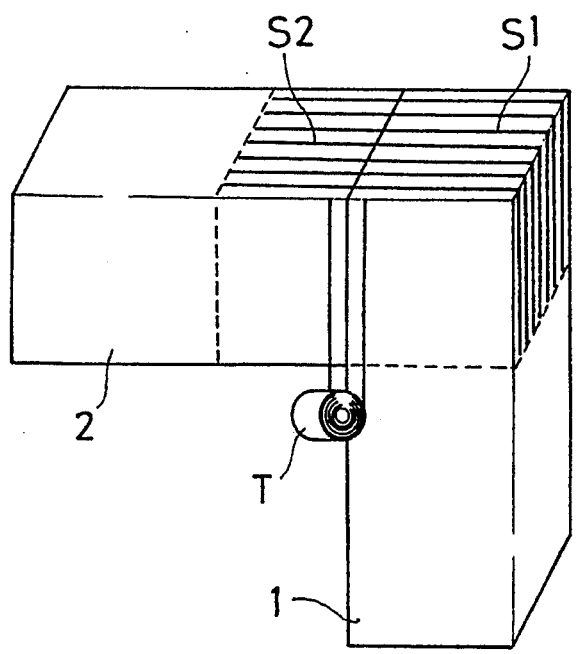
FIG. 15 is a view of a case for joining a length member(column) to a lumber opening of a width member (beam member) in the fourth embodiment.
Figure 16:
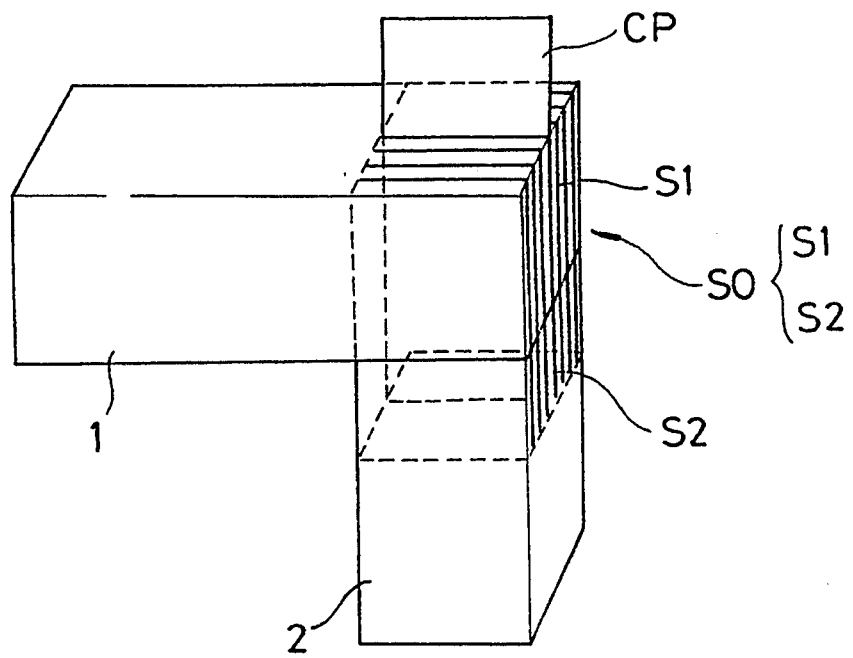
FIG. 16 is a perspective view showing a process for inserting the connecting plate into the slit portion in FIG. 14.
Figure 17:
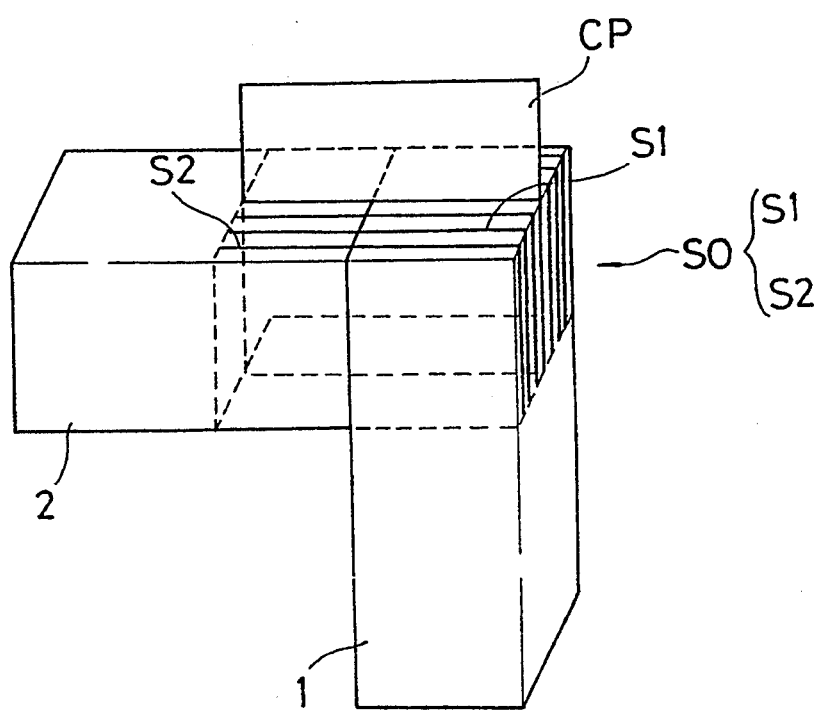
FIG. 17 is a perspective view showing a process for inserting the connecting plate into the slit portion in FIG. 15.
Figure 19A:
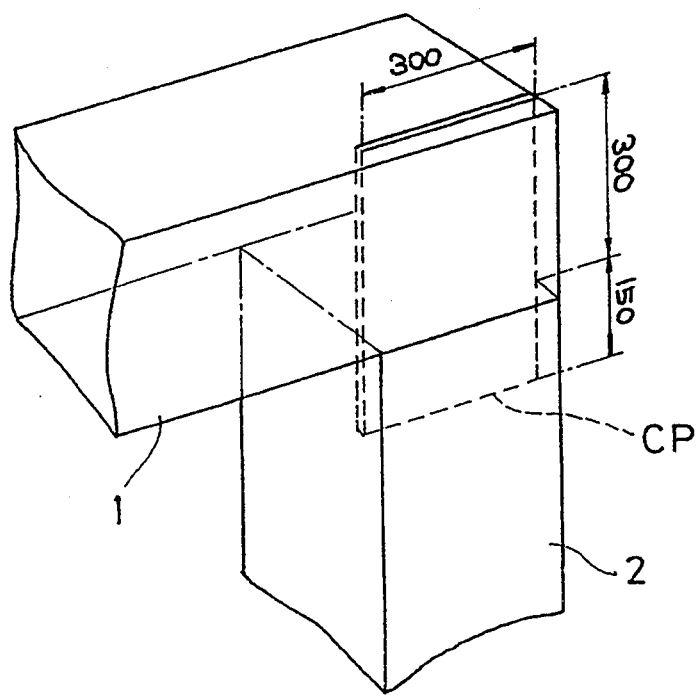
FIG. 19 is a side view showing a joining state of various kinds in the joining strength test of fourth embodiment.
Figure 19B:
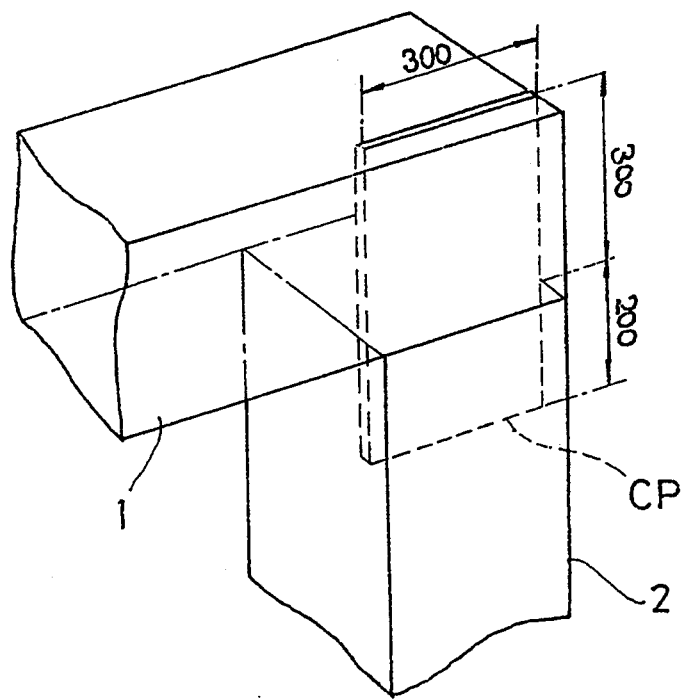
Figure 19C:
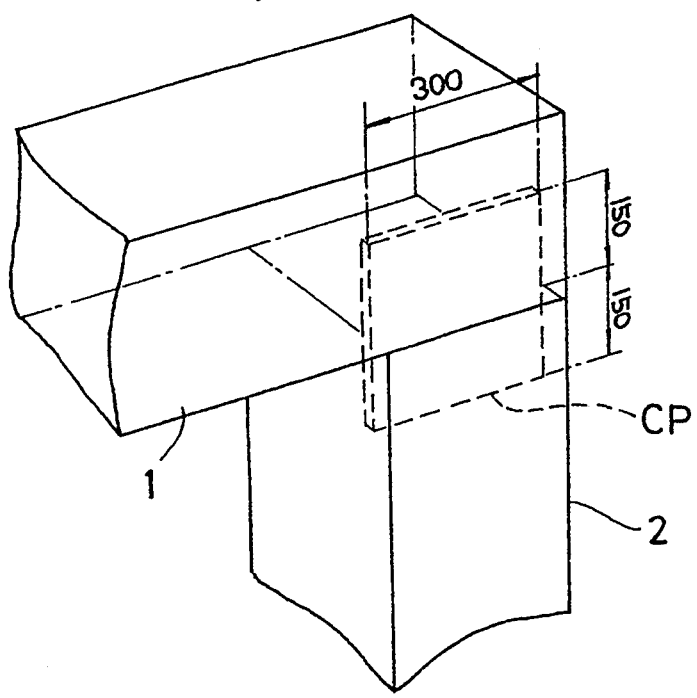
Figure 19D:
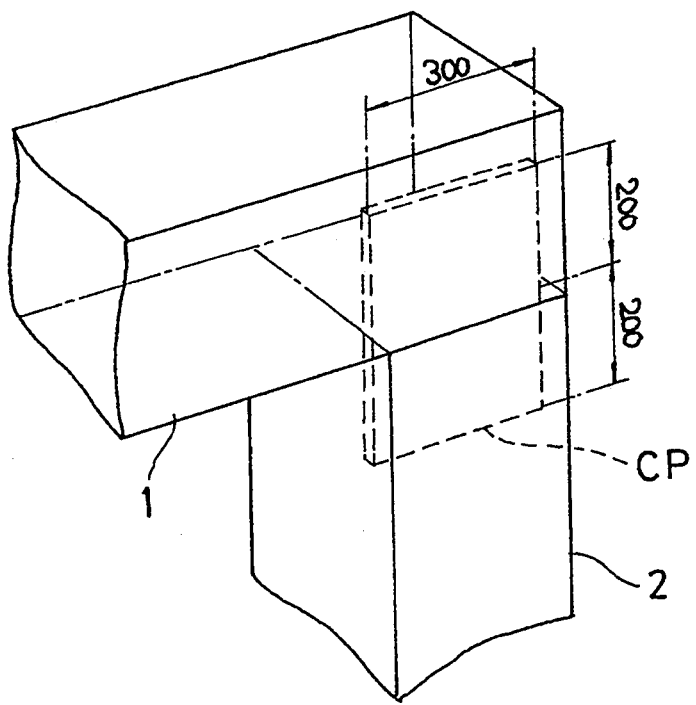
Figure 19E:
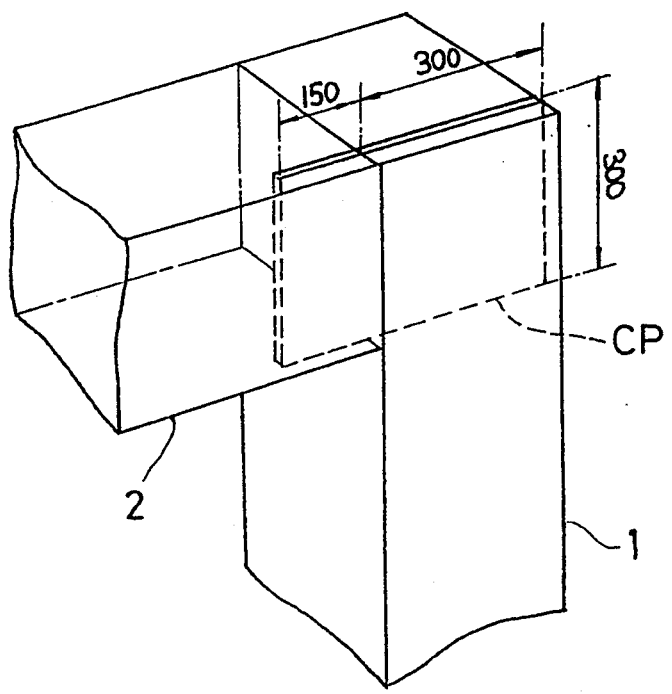
Figure 19F:
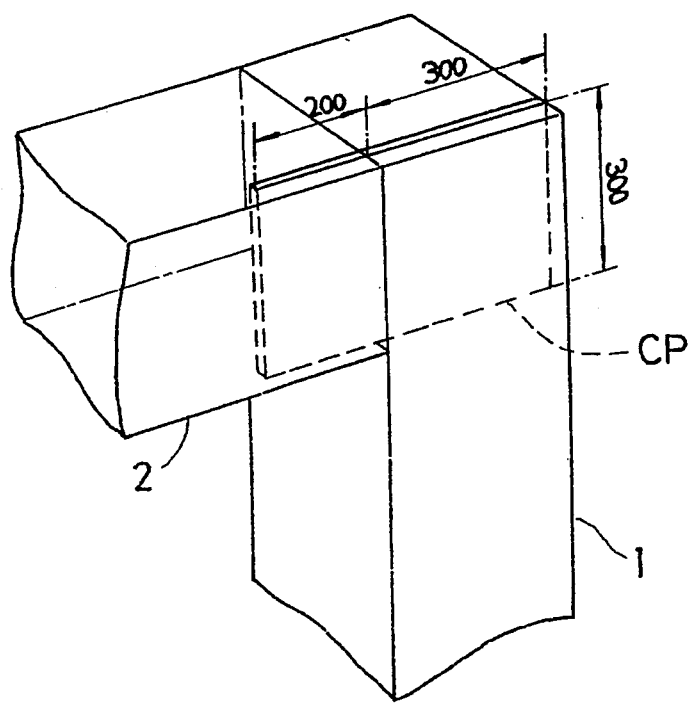
Figure 19G:
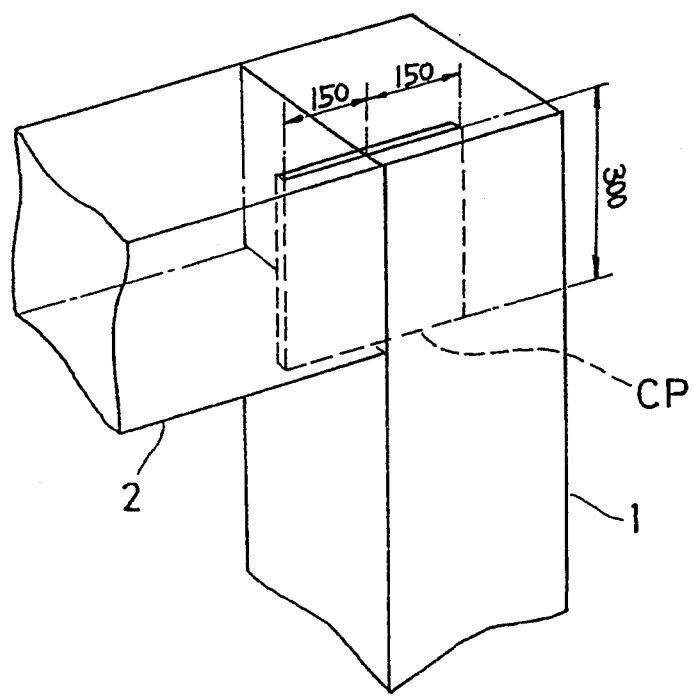
Figure 19H:
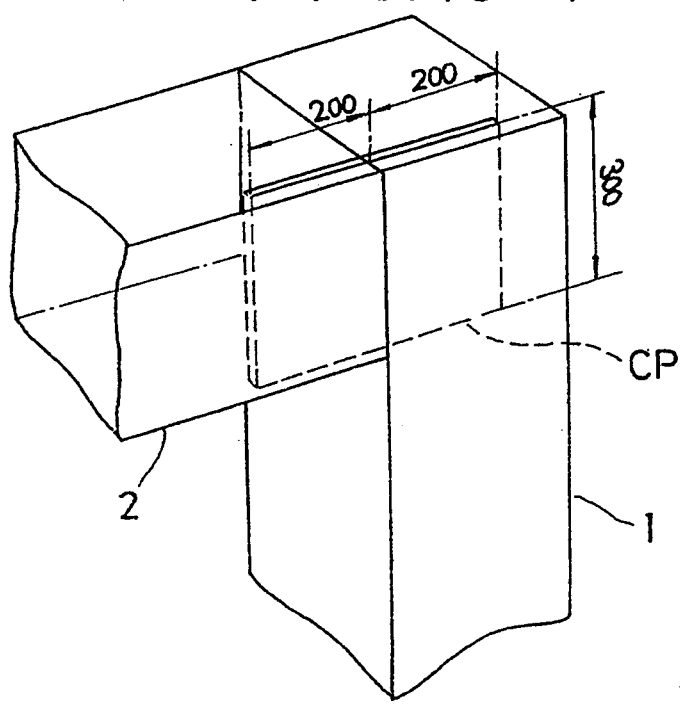

First, the slits S1,S2 are respectively formed by a circular saw at the end surface of the lumbers 1,2 desired to be joined(refer to FIG. 5). Successively, as shown in FIG. 14 and FIG. 18, two lumbers(collective material) 1,2 are abutted to rectangular direction, and each slit S1(seven rows), S2(seven rows) are made to form a same surface with each other. And, the sticker tape T is fixed to both sides and bottom of the joining portion of the lumber 1,2 whereby the lumber 1,2 are fixed to a joined state. In this state, as shown in FIG. 16 and FIG. 17, an epoxy resin adhesive agent is applied into the slits SO of seven rows made by the slits 1,2, and on the other hand, the connecting plate CP applied with same adhesive agent is inserted into the slits SO and then they are left in air until the adhesive agent would be hardened.

Following, table 4 is a table showing the result of joined strength test executed by variously changing the sizes of the slit and the connecting plate. This test is a compression test; as shown in FIG. 18, executing by placing a test material formed by the embodiment such that the load point comes to both end portions of the test material.

Further, (a)-(h) shown in the table 4 correspond to FIG. 19(a)-(h).

TABLE 4

| lit size mm) width length- lumber hickness) | Connecting plate width | Number of connecting | Maximum load ($10^3$ kg) | Maximum bending moment ($10^3$ kg × cm) | Bending strengt (kg/cm$^2$) |
| --- | --- | --- | --- | --- | --- |
| 1:300 × 300 | 450 × 300 | 7 | 7.77 | 649 | 288 |
| 2:150 × 300 | (a) | 7 | | | |
| S1:300 × 300 | 550 × 300 | 7 | 8.44 | 705 | 313 |
| S2:250 × 300 | (b) | 7 | | | |
| S1:150 × 300 | 300 × 300 | 7 | 2.58 | 215 | 96 |
| S2:150 × 300 | (c) | | | | |
| S1:200 × 300 | 400 × 300 | 7 | 4.55 | 380 | 169 |
| S2:200 × 300 | (d) | | | | |
| S1:150 × 300 | 400 × 300 | 7 | 7.15 | 597 | 265 |
| S2:300 × 300 | (e) | | | | |
| S1:200 × 300 | 500 × 300 | 7 | 9.60 | 802 | 356 |
| S2:300 × 300 | (f) | | | | |
| S1:150 × 300 | 300 × 300 | 7 | 2.25 | 188 | 84 |
| S2:150 × 300 | (g) | | | | |
| S1:200 × 300 | 400 × 300 | 7 | 4.15 | 347 | 154 |
| S2:200 × 300 | (h) | | | | |

As will be clear from above table 4, the joining strength increases in response to the increasing of length of the slit, and increases in response to the distance from the material end (lumber opening) of the lumber of the connecting plate CP becoming small, and when the connecting plate CP reaches up to the material end (lumber opening), it increases remarkably.

And, it has become clear that a case that the lumber opening of the width member(beam) 2 is joined to the side surface of the length member(column) (refer to FIG. 15), of which joined strength is stronger than a case that the opening of the length member(column) 1 is joined to the side surface of the width member(beam) 2 (refer to FIG. 14).

For the break down condition, in case that the connecting plate is not present up to the material end, the lumber is broken down at adjacent of the connecting plate end portion of the material end side, and in case that the connecting plate is reached up to the material end, the adhered layer of the connecting plate has been exfoliated and then the lumber is broken down at adjacent of the connecting plate end portion of interior side. Accordingly, it is thought that when the sizes of the interior side {opposite side to the material end(lumber opening)} of the connecting plate and the slit are increased than 200 mm, the joining strength can be increased slightly.

From above result, it has become clear that when the lumber is adhered and joined by interposing the reinforced plastic connecting plate of appropriate size between the slits by the above-described process, it is possible to make them integral without reducing the strength.

Figure 21:
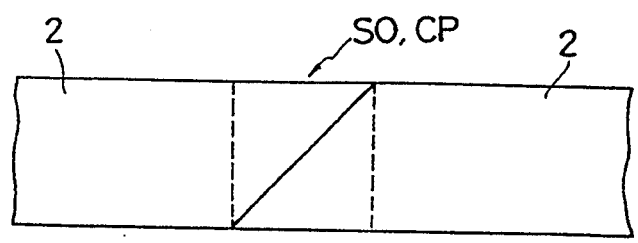
FIG. 21 is a front view showing a joining portion in FIG. 19.

FIG. 20 and FIG. 21 are views showing a fifth embodiment, in which the lumbers 1,2 are joined to a straight direction. FIG. 20 is a perspective view before the joining, and FIG. 21 is a front view after the joining.

At here, each end surface of the lumbers 1,2 is not changed from aforementioned embodiment except that it is formed to a slant surface of 45 degrees angle.

Figure 22:
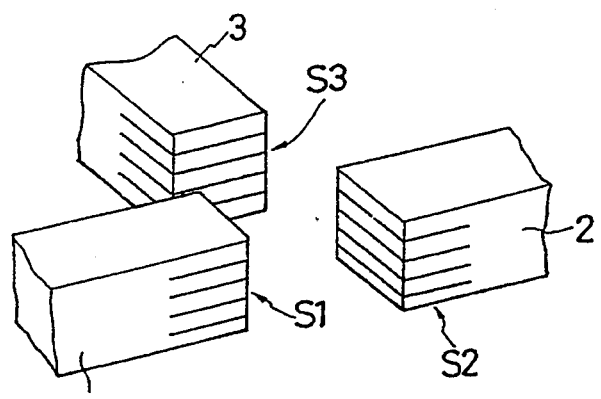
FIG. 22 is a view showing a sixth embodiment of the present invention, and is a perspective view showing each lumber end portion and a cut out state of the slit.
Figure 23:
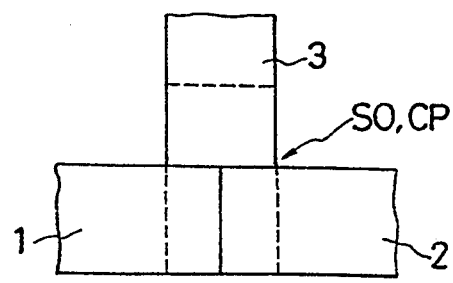
FIG. 23 is a front view showing a joining portion in FIG. 22.

FIGS. 22 and 23 are views showing a sixth embodiment, in which three members are joined orthogonally to three directions.

FIG. 22 shows a state that the slits S1,S2 and S3 are respectively formed to each end surface of the collective materials 1,2 and 3, and FIG. 23 is a plane view showing a state that each end surface of these collective materials 1,2, and 3 are abutted and the slit portion SO is formed, and aforementioned connecting plate CP is inserted into this whereby the three collective materials are joined. Details of the process is deleted because it is same as aforementioned.

FIG. 24 is a plane view showing a seventh embodiment, in which four members are joined in four directions.

Figures 24A, 24B:
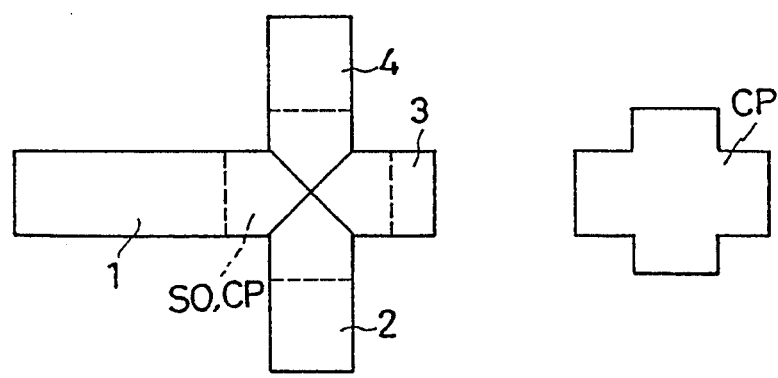
FIG. 24 is a seventh embodiment of the present invention, and is a perspective view showing a joined state of each lumber end portion and a pattern of the connecting plate.

In this embodiment, the abutting end surfaces of the four collective materials 1,2,3 and 4 are formed to protrude in a shape of an isoscales triangle such that they are inserted each other, and the confronting each collective materials become to straight, and the adjoining collective materials are rectangularly crossed. In {(FIG. 24(a))}, the slit portion SO is made by the slits formed to each end portions, to which the connecting plate CP of a shape shown in FIG. 24(a) is inserted and fixed whereby the four collective materials are joined as shown in FIG. 24(a). Details of the process is deleted because it is same as aforementioned.

Figure 25:
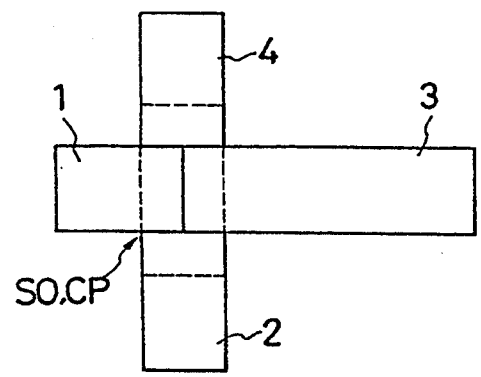
FIG. 25 is a view showing an eighth embodiment of the present invention, and is a perspective view showing a joined state of each lumber end portion and a relative relation of the connecting plate.

FIG. 25 is a plane view showing an eighth embodiment, in which four members are joined orthogonally in to four directions. In this embodiment, the end surfaces of each collective materials 1,2,3 and 4 are orthogonally formed. Others are same as aforementioned.

Figure 26:
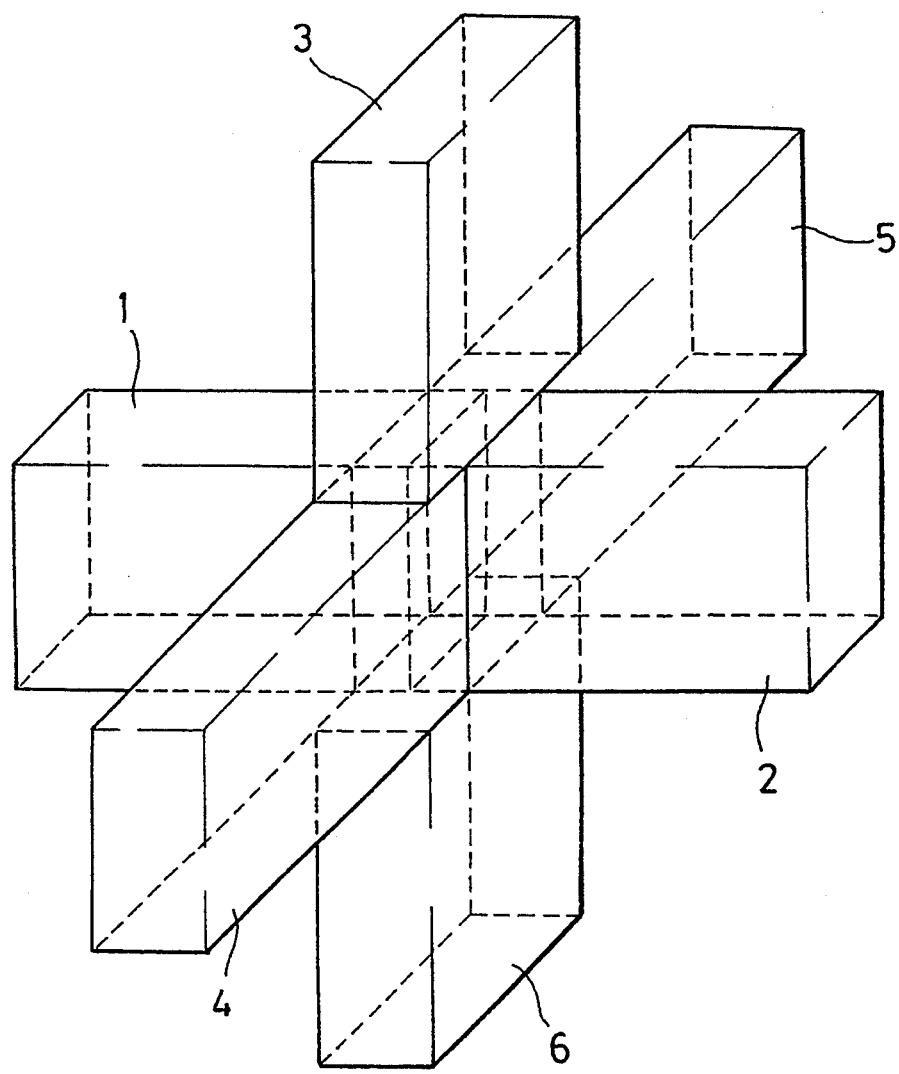
FIG. 26 is a view showing a ninth embodiment of the present invention, and is a perspective view showing a joined state of each lumber end portion.
Figure 27:
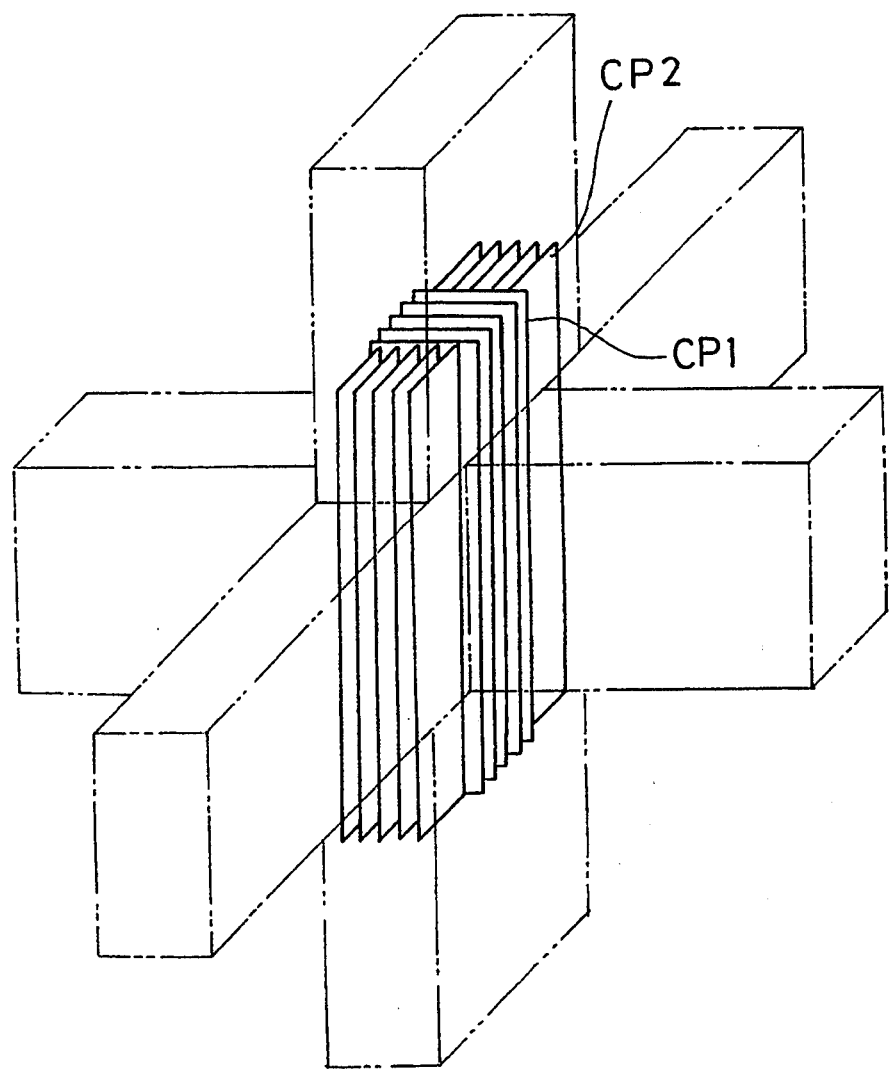
FIG. 27 is a front view showing a pattern of the connecting plate and a joined state of the lumbers 1, 2, 3 seen from arrow A direction in FIG. 26.
Figure 28B:
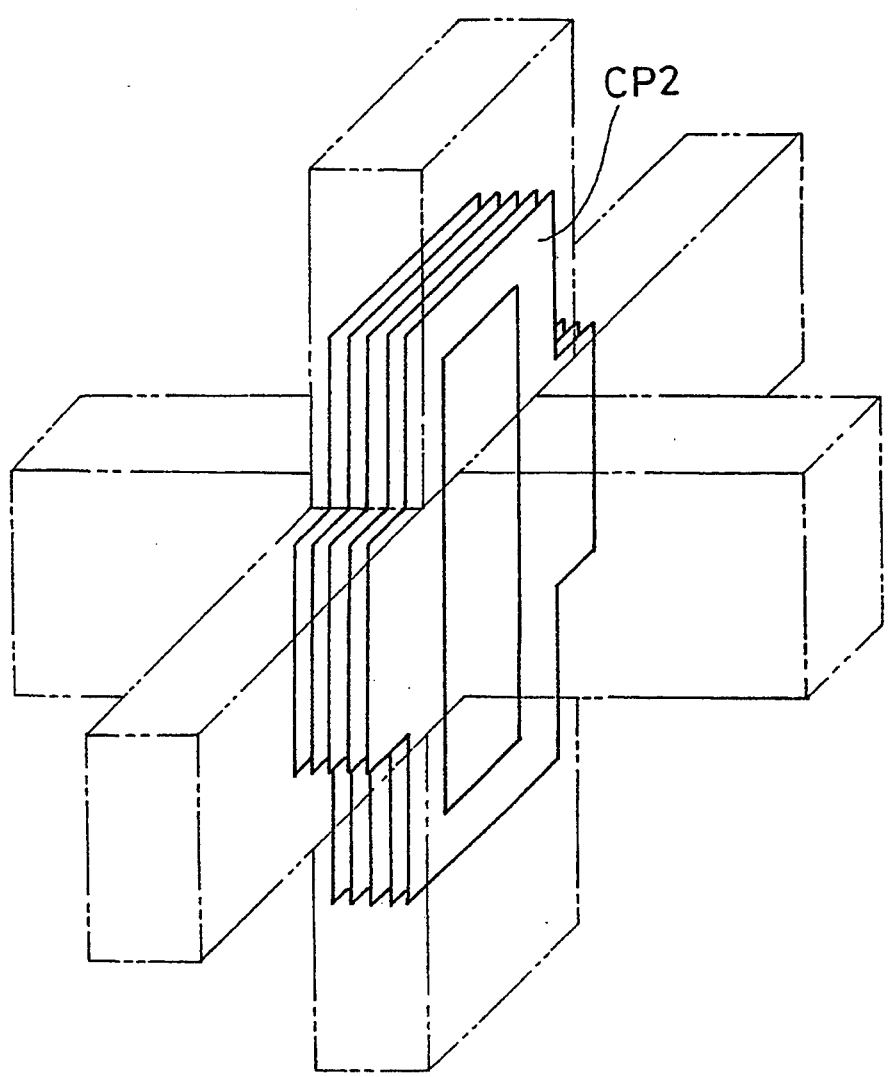
FIG. 28 is a front view showing a pattern of the connecting plate and a joined state of the lumbers 4, 5, 6 seen from arrow B direction in FIG. 26.

FIG. 26 to FIG. 28 are views showing a ninth embodiment in accordance with the present invention, in which six members are joined orthogonally in six directions. FIG. 26 is a perspective view showing a coupling relation in the joining portion of the end portion of each collective material 1,2,3,4,5, and 6, and the connecting plates CP1,CP2 are inserted into the slits formed to the end portions of each collective materials 1,2,3,4,5 and 6 as shown in FIG. 27. FIG. 28(a) is a perspective view showing the aforementioned connecting plate CP1, and FIG. 28(b) is a perspective view showing also the connecting plate CP2. The connecting plate CP2 shown in FIG. 28(b), of which shape differs from the connecting plate CP2 shown in FIG. 27 in order to increase the strength.

Figure 29A:
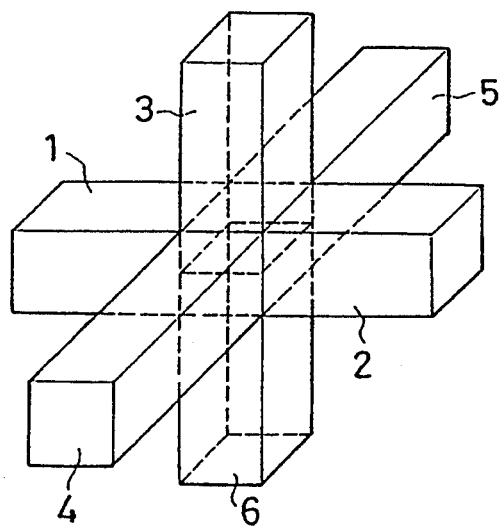
FIG. 29 is a view showing a tenth embodiment of the present invention, and is a perspective view showing a pattern of the connecting plate and a joined state of each lumber end portion.
Figure 29B:
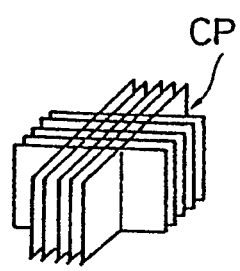

FIG. 29 is a view showing a tenth embodiment, in which six members are joined orthogonally in six directions. FIG. 29(a) is a perspective view showing a coupling relation in the joining portion of each end portion of the collective materials 1,2,3,4,5 and 6, and FIG. 29(b) is a prespective view showing a connecting plate CP used for this.

In this embodiment, the end surfaces of each collective material are right angled, to which each slit is formed whereby abutted as shown in FIG. 29(a). The connecting plate of a shape shown in (b) is interposed between each slits whereby each collective material is fixed. Details are deleted because it is same as aforementioned.

We claim:

1. A method for joining two wooden members each including a respective end portion, comprising the steps of:
    forming a plurality of slits in each end portion;
    abutting said end portions such that the slits of one of said end portions are aligned with the slits of the other of said end portions;
    fixing said end portions together with temporary fixing means;
    applying an adhesive agent to interior surfaces of said slits;
    inserting connecting plates into said aligned slits for connecting the abutted end portions of said wooden members and said connecting plates being affixed within said aligned slits upon hardening of said adhesive agent.

2. The method of claim 1, wherein said temporary fixing means includes a transparent tape having a sticky backing.

3. The method of claim 1, wherein said connecting plates are formed of a reinforced plastic material.

4. The method of claim 3, wherein said reinforced plastic material is an epoxy resin reinforced by a glass fiber.

5. The method of claim 3, wherein said reinforced plastic material is an epoxy resin reinforced by a carbon fiber.

6. The method of claim 2, wherein said connecting plates are formed of a reinforced plastic material.

7. The method of claim 6, wherein said reinforced plastic material is an epoxy resin reinforced by a glass fiber.

8. The method of claim 6, wherein said reinforced plastic material is an epoxy resin reinforced by a carbon fiber.

9. The method of claim 1, wherein said adhesive agent is an epoxy resin.

10. The method of claim 9, wherein said epoxy resin is an acryl or polyurethane group epoxy resin.

11. A method for joining two wooden members each including a respective end portion, comprising the steps of:
    forming a plurality of slits in each end portion;
    abutting said end portions such that the slits of one of said end portions are aligned with the slits of the other of said end portions;
    fixing said end portions together with temporary fixing means;
    providing connecting plates;
    applying an adhesive agent to exterior surfaces of said connecting plates;

inserting said connecting plates into said aligned slits for connecting and affixing the abutted end portions of said wooden members.

12. The method of claim 11, wherein said temporary fixing means includes a transparent sticker tape.

13. The method of claim 11, wherein said connecting plates are formed of a reinforced plastic material.

14. The method of claim 13, wherein said reinforced plastic material is an epoxy resin reinforced by a glass fiber.

15. The method of claim 13, wherein said reinforced plastic material is an epoxy resin reinforced by a carbon fiber.

16. The method of claim 12, wherein said connecting plates are formed of a reinforced plastic material.

17. The method of claim 16 wherein said reinforced plastic material is an epoxy resin reinforced by a glass fiber.

18. The method of claim 16, wherein said reinforced plastic material is an epoxy resin reinforced by a carbon fiber.

19. The method of claim 11, wherein said adhesive agent is an epoxy resin.

20. The method of claim 19, wherein said epoxy resin is an acryl or polyurethane group epoxy resin.

* * * * *